April 28, 1942.    R. A. KAISER    2,281,502
ORDNANCE
Filed March 28, 1938    3 Sheets-Sheet 1

INVENTOR:
R. A. Kaiser;
BY
Robert C. Roesch
ATTORNEY

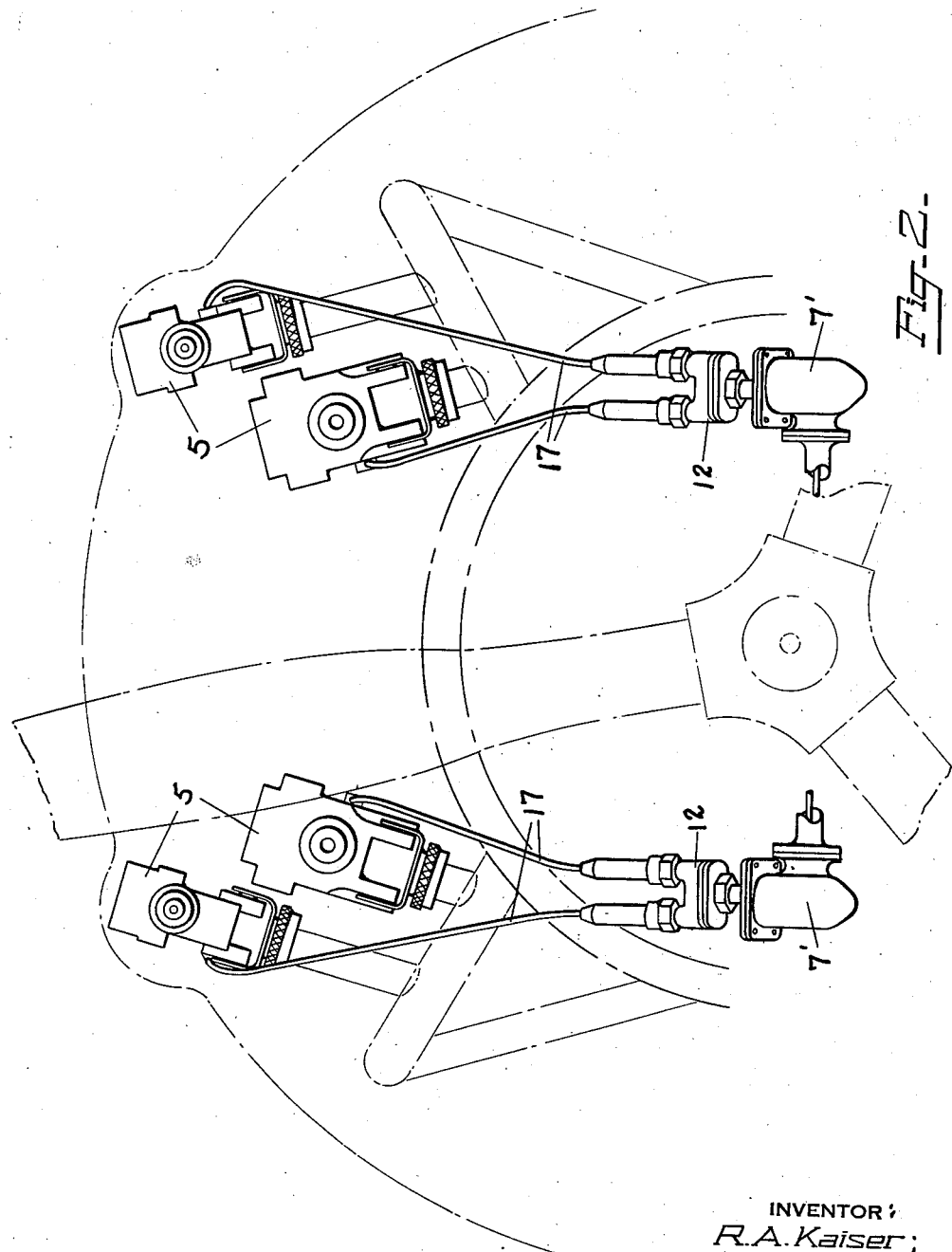

April 28, 1942.  R. A. KAISER  2,281,502
ORDNANCE
Filed March 28, 1938  3 Sheets-Sheet 3
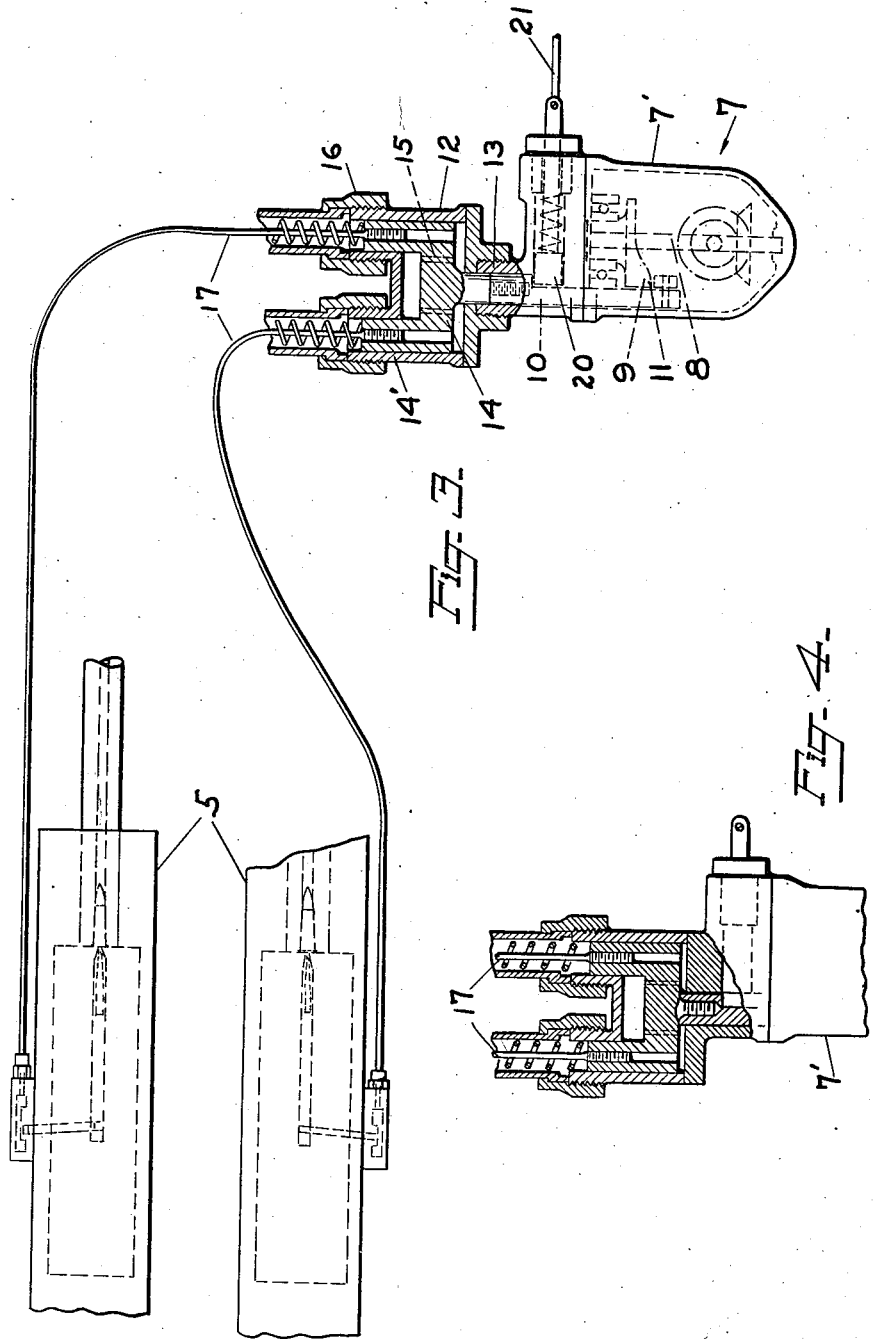

Patented Apr. 28, 1942

2,281,502

UNITED STATES PATENT OFFICE 2,281,502

ORDNANCE

Robert Adam Kaiser, Glendale, N. Y., assignor to Republic Aviation Corporation, a corporation of Delaware Application March 28, 1938, Serial No. 198,437

4 Claims. (Cl. 89—37.5)

This invention relates to aircraft ordnance, particularly machine guns.

While it has been proposed hitherto to simultaneously fire a plurality of machine guns in aircraft through the propeller disc, such proposals have hitherto necessitated either a separate synchronizer-unit for each gun, or else have been based on complex, delicate and unreliable electrical synchronizers quite susceptible to breakdowns caused by gun or engine vibrations.

It is the chief object of the present invention to provide means for simultaneously firing a plurality of machine guns through the propeller disc of even three-bladed propellers with the employment of but one synchronizer,—and that a mechanical, non-electrical synchronizer—for the plurality of guns.

Another object of the invention is to provide gun-control means which will entail a closer arrangement of a plurality of fixed guns firing through a propeller disc to thereby enable more accurate sighting by the gunner with less movement of his head or eyes and with lesser adjustment of the gun parts, as well as permitting a greater number of guns to be mounted in a smaller compass.

A further object of the invention is to provide a machine-gun firing-system and installation which will materially enhance the rapidity and ease with which serving, servicing and maintenance of the guns can be accomplished.

The other objects and advantages of the invention will manifest themselves as this disclosure progresses.

The invention is further particularized hereinbelow in conjunction with the accompanying drawings, but it is to be understood that the invention is limited in its embodiments only by the scope of the sub-joined claims. In these drawings, Fig. 1 is a fragmentary, diagrammatic detail of one half of a machine-gun installation involving the present concepts;

Fig. 2 is a section on line 2—2 of Fig. 1, sighting in the direction of the arrows;

Fig. 3 is a fragmentary, diagrammatic detail of the synchronizing combination, and Fig. 4 is a sectional detail of a modified form of the synchronizer per se.

Figure 1:
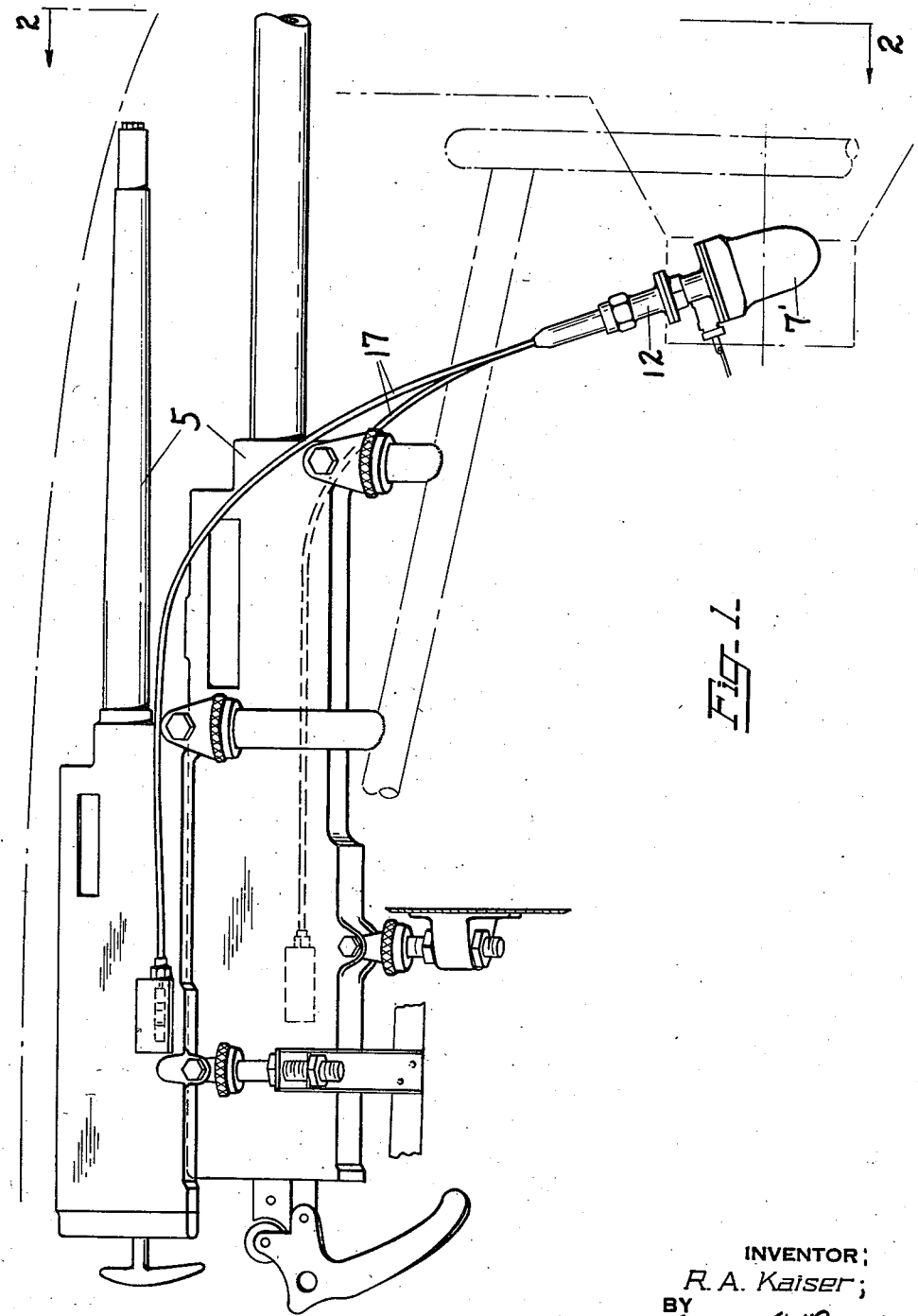

The apparatus of the present invention is primarily adapted to synchronize the fire of guns fixed in the nose of the fuselage of a pursuit airplane for firing forwardly through the propeller disc and will be described hereinafter with this in mind, but it will become manifest that the apparatus can equally well be incorporated with fixed guns on the leading edge of the wings, or on trellis, etc., and firing aft. It is also contemplated that the invention be incorporated in movable, or "flexible," guns, either on aircraft or on the ground.

Referring to the drawings disclosing at least one embodiment of the inventive concepts, the construction shown includes a portion of the fuselage of an airplane,—carrying an engine mount,—and a portion of the engine cowling surrounding the engine. Fixedly mounted on the engine support, to lie fore-and-aft of the fuselage, by suitable brackets, is a plurality of aircraft-type machine guns 5. The invention contemplates that these guns be of any calibre, but preferably .30 and .50 calibre, and be of standard construction and be installed with their structure and fittings unaltered from the conventional, and each including a trigger-motor. Thus, the invention is applicable to any type of aircraft machine gun.

The guns are arranged in groups, preferably two groups, as shown, each group comprising a plurality of guns 5, and one group lying on one side of the center-line of the propeller disc near the periphery of the engine-cowling, the other group lying on the other side of said center-line equally near the periphery of said cowling. In accordance with an inventive concept to be hereinafter particularized, the guns in each group are arranged on one and the same radial line, or projection aft, parallel to itself, of the radius of the propeller disc, the guns in the group being mounted successively from the periphery of the cowling along the same radius towards the center, projected aft, of the propeller disc, for a reason hereinafter made manifest. They all fire ahead through the propeller disc in synchronism therewith, and can be fired simultaneously, in groups, or one gun of one group firing with one gun of another group.

The invention contemplates controlling the simultaneous firing of all the guns in each group, no matter what number in each group there may be, from one single un.t consisting solely of mechanical members not involving the use of electricity, etc. To this end, below each group of guns an impulse-generator 7 in the form of a cylindrical casing 7' is inclinedly mounted securely in the secondary cowling space substantially on the horizontal center line of the engine and contains a rotary shaft 8 driven from the engine shaft by suitable power-transmission, not shown. The shaft 8 bears a fixed, single-lobe cam 9. A reciprocable rod 10 is adapted to be engaged by the lobe 11 of the cam once in every revolution thereof by means of the penetration of the lobe into a kerf in the periphery of the member 10.

The member 10 projects from a separate casing 12 mounted on a protuberance 13 of the first casing. The upper end of member 10 is integral with a bifurcated yoke-piece 14 adapted to reciprocate in the body and in two tubes 14' of the casing 12. In order to prevent "pumping" of the member 14 in the casing, it is provided with bores 15 constituting air-vents. Screwed around the ends of the tubes 14' are members 16 carrying and guiding spring-loaded tensile members 17. One end of each such member is fixed to an end of the yoke, and the other end is attached to the firing-pin operating member of the trigger-motor on one of the guns in a group, the other gun or guns in a group being similarly connected.

A spring-loaded lock 20 for the member 10 is mounted in the casing 7', and has a tensile-member 21 leading to a trigger-lever 22 on the joystick, or other suitable point, in the pilot's cockpit. When the member 20 is withdrawn from its engagement with the member 10, the engine being in operation, the shaft 8 is rotated, carrying the cam around with it, which cam in turn reciprocates the yoke once in every revolution of the shaft 8, which causes the tensile-members 17 to operate the plunger of the trigger-motor and move the firing-pin of the gun forwardly once every revolution of the propeller shaft, if the latter be direct-driven. However, the machine-guns will fire only when there is a cartridge in the breech, and as the rate of inserting them is seldom equal to the rate of revolution of the engine-shaft, thus, though the propeller shaft and shaft 8 may be geared directly to the engine and the firing pin reciprocated in the block once every revolution, the guns 5 will not always fire once for every revolution of the engine-shaft. Instead, though the tensile-members 17 are continuously operated once every revolution of the engine-shaft, and thus operate the firing-pin similarly, the gun will fire only at the rate predetermined by its "loading-rate," or rate of inserting a cartridge in the breech, and that will equal the rate of revolution of the propeller shaft only when the latter equals the rate of loading of the gun. However, at any rate of rotation, the timing of loading of the guns mounted on the radial line is so co-ordinated with the angular positions of the blades of the propeller that all guns that fire, fire substantially two inches ahead of the time of arrival of the leading-edge of any propeller blade, whether it be a two, three, or four-bladed propeller. If the leading-edges be curved, the radial line of mounting of the guns will be curved, according to the present invention, in conformity therewith, so that in no case is there any danger of a blade intercepting a projectile, and instead, all guns are synchronized with the rotation of the blades.

In order to facilitate feed of ammunition, each of the guns is tilted 15° away from the vertical, as shown. Due to this tilting of the guns and to their arrangement on a radial line, a greater number of fixed guns than heretofore can be employed in a given peripheral and volumetric space in the nose of the fuselage of an airplane also carrying an engine, etc. in the nose. The invention also manifestly involves the advantage of enabling more accurate sighting of the guns than heretofore, due to their being adapted to be mounted closely adjacent the upper periphery of the nose of the fuselage, all well within the gunner's fixed line-of-sight range. Due to their being mounted in an easily accessible location, on the top of the fuselage, servicing and maintenance are facilitated materially. Depending of course on the diameter of the engine, or length of cylinders, if a radial engine, and of its cowling, any number of guns can be mounted on a radius in any one group, and all the guns of one group can be fired simultaneously in synchronism with the propeller by the one novel synchronizing device.

I claim:

1. A machine-gun installation of the character described comprising a plurality of machine guns, a trigger-motor associated with each machine gun, mechanism for simultaneously operating said trigger motors, said mechanism including a rotary cam, means for continuously rotating the cam, a lower casing enclosing the cam, an upper casing contiguous with said lower casing, a slide member supported in the lower casing and arranged to be reciprocated by said cam, said slide member terminating in a pair of laterally disposed arms slidable in the upper casing, a spring-loaded tensile member extending between each of said arms and a trigger-motor, and means for locking said slide member against reciprocation.

2. A machine-gun installation of the character described comprising a plurality of machine guns, a trigger-motor associated with each machine gun, mechanism for simultaneously operating said trigger-motors, said mechanism including a rotary single-lobe cam, means for continuously rotating the cam, a lower casing enclosing the cam and having a slideway opening therethrough, an upper casing mounted on said lower casing, a slide member supported in the lower casing and arranged to be reciprocated in said slideway by said cam, said slide member terminating in a pair of laterally disposed arms slidable in the upper casing, air-escape vents in said upper casing, a spring-loaded tensile member extending between each of said arms and a trigger-motor, and means for locking said slide member against reciprocation.

3. In an aircraft having a rotary propeller shaft, a propeller mounted on said shaft and means for driving the shaft, the combination of a plurality of machine guns mounted for firing through the path of rotation of the propeller, said machine guns being located in substantially a common radial plane with respect to and upon the same side of the propeller shaft, and a unitarily reciprocable means driven from said propeller shaft for simultaneously firing said machine guns.

4. In an aircraft having a rotary propeller shaft, a propeller mounted on said shaft and means for driving the shaft, the combination of a plurality of machine guns mounted for firing through the path of rotation of the propeller, said machine guns being located in substantially a common radial plane with respect to and upon the same side of the propeller shaft, a firing mechanism for each of said machine guns, unitarily reciprocable means driven from said propeller shaft and control means extending between said reciprocable means and each of said firing mechanisms for simultaneously firing said machine guns.

ROBERT ADAM KAISER.